United States Patent [19]

McCracken et al.

[11] 4,417,470
[45] Nov. 29, 1983

[54] ELECTRONIC TEMPERATURE SENSOR

[75] Inventors: Oliver W. McCracken, Pauls Valley, Okla.; James H. Bostock, Denton, Tex.

[73] Assignee: Otis Engineering Corporation, Dallas, Tex.

[21] Appl. No.: 307,284

[22] Filed: Sep. 30, 1981

[51] Int. Cl.³ ............................................. E21B 47/06
[52] U.S. Cl. ..................................... 73/154; 374/136; 374/165; 374/208
[58] Field of Search ................. 73/154; 374/136, 208, 374/185, 178, 163; 340/870.17, 870.39, 870.26

[56] References Cited

U.S. PATENT DOCUMENTS

| | | | |
|---|---|---|---|
| 2,191,765 | 2/1940 | Lohman | 374/136 |
| 2,764,024 | 9/1956 | Rumble | 374/136 |
| 3,044,298 | 7/1962 | Hodges et al. | 374/136 |
| 3,561,832 | 2/1971 | Karrer et al. | 310/338 |
| 3,670,567 | 6/1972 | Stout | 73/154 |
| 3,986,393 | 10/1976 | Hawley | 73/154 |
| 4,107,697 | 8/1978 | McCracken | 346/33 R |
| 4,161,782 | 7/1979 | McCracken | 364/571 |
| 4,198,621 | 4/1980 | Roper | 340/870.39 |
| 4,267,727 | 5/1981 | Hoppe | 73/151 |
| 4,277,975 | 7/1981 | Pinkham | 374/178 X |

Primary Examiner—Jerry W. Myracle
Assistant Examiner—Brian Tumm
Attorney, Agent, or Firm—Thomas R. Felger

[57] ABSTRACT

The present invention discloses a temperature sensor which has a very rapid response to changes in fluid temperature. The configuration of the sensor is especially adapted for use in oil and gas wells to protect electrical components from mechanical damage. The electrical circuit provides a wide range of temperature readings with a high degree of accuracy.

7 Claims, 6 Drawing Figures

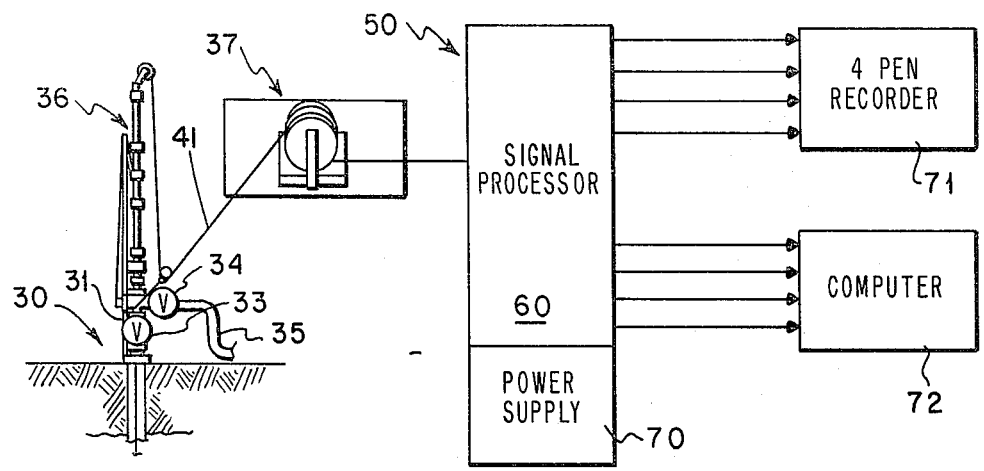
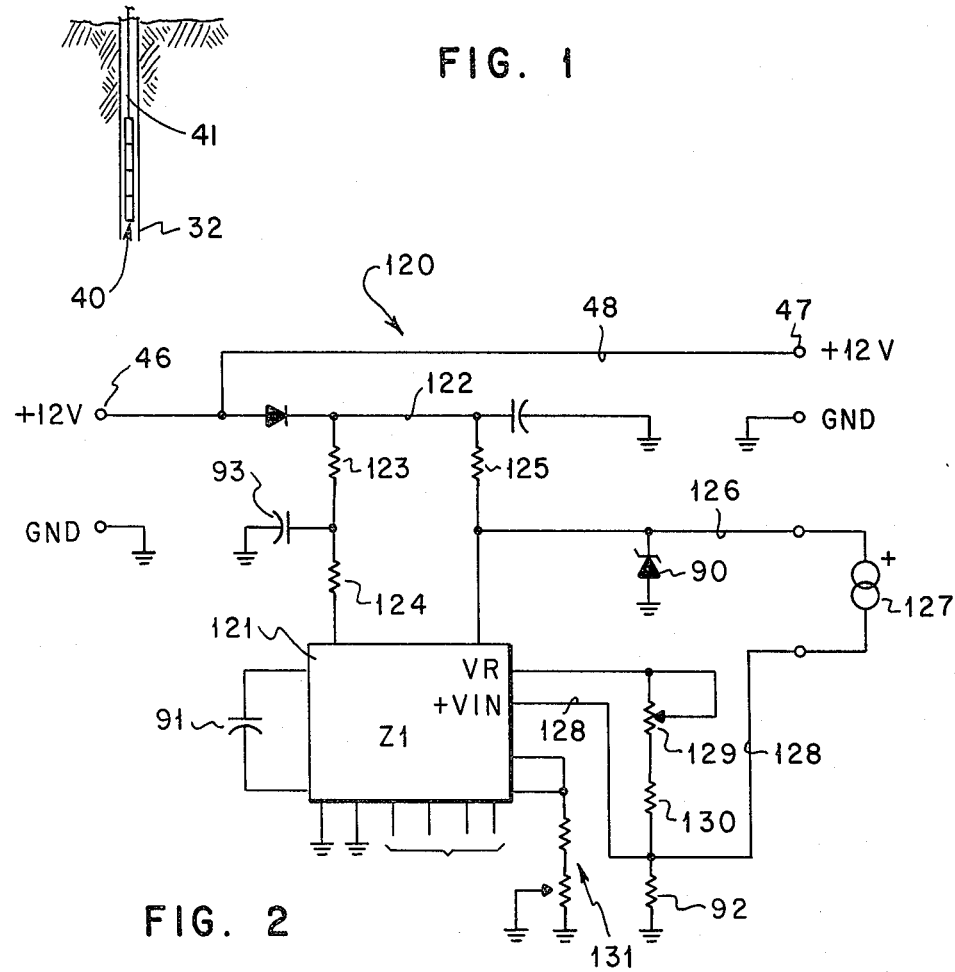
FIG. 1
FIG. 2

ELECTRONIC TEMPERATURE SENSOR

BACKGROUND OF THE INVENTION

1. Field of the Invention

This invention relates generally to electronic temperature sensors for measuring the temperature of fluids remote from a recording device. The present invention is particularly adapted for measuring fluid temperature at a downhole location within the bore of an oil or gas well and recording the temperature at the well surface.

2. Description of the Prior Art

For many years, operators of oil and gas wells have been interested in measuring various physical parameters associated with each well in order to understand the characteristics of the underground hydrocarbon producing formation and to optimize the production of hydrocarbons from each well. Some of the more frequently measured parameters are:
- a. bottom hole pressure and surface pressure while the well is both flowing and shut in;
- b. flow rate versus pressure and direction of fluid flow;
- c. pressure versus time both during pressure buildup after shutting in a well and pressure drawdown when flow is resumed;
- d. oil versus gas ratio in the production fluid; and
- e. fluid temperature at which each of the above tests is conducted.

U.S. Pat. No. 4,107,697 titled Pressure Recorder with Power Conservation Means and U.S. Pat. No. 4,161,782 titled Microprocessor Computerized Pressure/Temperature/Time Down-Hole Recorder disclose well tools which can measure and record some of these parameters. Both patents are incorporated by reference for all purposes within this application. Accurate determination of fluid temperature is critical for the validity of any well testing.

SUMMARY OF THE INVENTION

The present invention discloses methods and apparatus for measuring temperature and transmitting information from a temperature sensor comprising a terminal for receiving electrical power supplied to the sensor and transmitting information from the sensor; a temperature sensing element which changes its electrical output in proportion to the surrounding fluid temperature; a voltage to frequency converter; a voltage regulating network connecting the terminal with both the sensing element and the converter and directing electrical power to each; the output from the sensing element supplying an input to the converter; the converter producing a frequency output which is proportional to the current from the sensing element; and a frequency adjusting network for controlling the output of the converter to within a preselected frequency range.

One object of the present invention is to provide a temperature sensor that can be electrically connected with a standard single conductor electrical line and transmit information about the surrounding fluid temperature to a remotely located recording means.

Another object of the present invention is to rigidly measure temperature changes of fluid surrounding the temperature sensor.

These and other objects and advantages of the present invention will become apparent to those skilled in the art from the following drawings, written description, and claims.

BRIEF DESCRIPTION OF THE DRAWINGS

FIG. 1 is a schematic drawing, partially in section and elevation, showing the present invention as used with respect to an oil and gas well. The recording means located at the well surface is shown in block diagram form.

FIG. 2 is a schematic drawing of the electrical circuit for a temperature sensor incorporating the present invention.

DESCRIPTION OF THE PREFERRED EMBODIMENTS

Figure 3A:
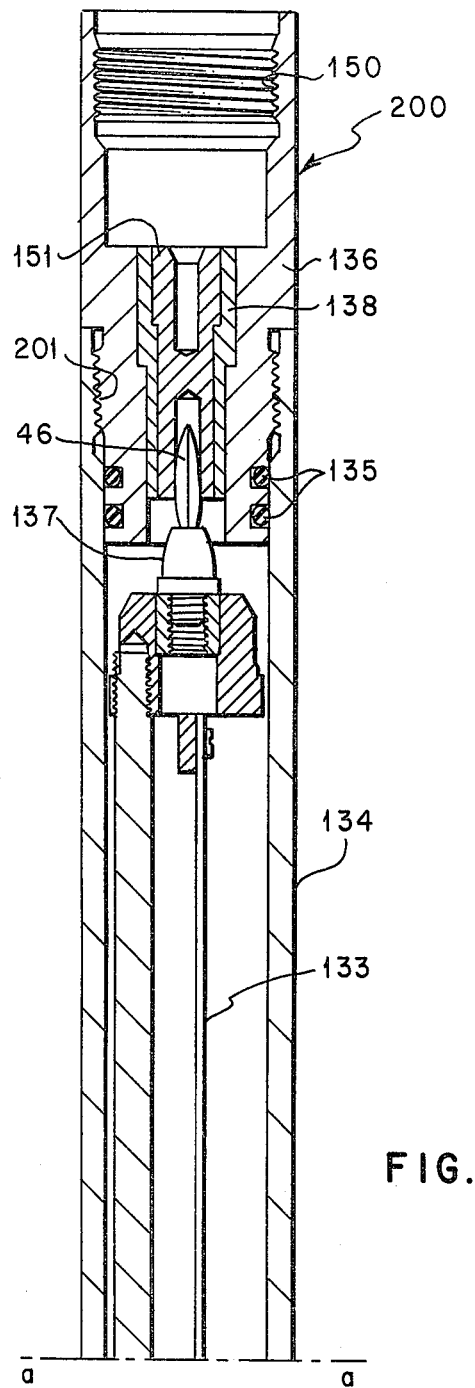
FIGS. 3A, B and C are schematic drawings, partially in section and partially in elevation, showing a well tool adapted for carrying a temperature sensor of the present invention.

This description is made with respect to using the present invention to measure fluid temperature at a downhole location within an oil and gas well. However, this invention can be used in other types of temperature measuring system.

FIG. 1 shows a typical well installation for using the present invention in combination with other sensors. Well 30 includes wellhead equipment 31 at the well surface and casing 32 extending from wellhead 31 to the underground producing formation. Master valve 33 and wing valve 34 are used to control the production of fluids from well 30 into surface flow line 35.

A standard wireline lubricator and associated equipment 36 are shown attached to the top of wellhead 31. Standard wireline techniques are used to install within and remove downhole tool 40 from the well bore defined by casing 32. Downhole tool 40 is attached to a standard single conductor electrical line 41 with wireline winch 37 used to raise and lower tool 40. Single conductor electrical line 41 is electrically connected to recording means 50 which includes a signal processor 60, power supply 70, four pen recorder 71 and computer 72. Copending patent application Ser. No. 307,285 filed on Oct. 9, 1981, fully discloses the operation of downhole tool 40 and recording means 50. Temperature sensor 120 as shown in FIGS. 2 and 3 is specifically adapted for use with tool 40. However, temperature sensors incorporating the present invention can be used separately or in combination with a wide variety of well tools. The present invention requires only a source of direct current (DC) electrical power and a recording means to convert the frequency output from the sensor into a temperature reading.

FIG. 2 shows the electrical circuit drawing for temperature sensor 120. Electrical power to operate sensor 120 is supplied by electrical line 41 to terminal 46. The circuit in FIG. 2 is designed to operate with a 12 volt DC input. Various alternative electrical circuits and power supplies will be apparent to those skilled in the art to carry out the present invention. The typical, standard electrical line which can be used as single conductor line 41 consists of an electrically conductive wire (copper) surrounded by insulating material. The outer layers of the insulating material are reinforced by additional wires (steel) and/or wrapped by reinforcing wire mesh. This outer protective layer of line 41 is grounded.

The electrical flow path is through the center wire within line 41 to tool 40 and its electrical components. The return flow path is via ground which includes the outer protective layer of line 41. The term "single conductor" refers to the center wire within line 41.

Line 122 supplies DC energy from terminal 46 to DC voltage to frequency converter 121 via appropriately sized resistors 123, 124, and 125. Resistor 125 plus lines 122 and 126 function as part of the voltage regulating network supplying electrical power to converter 121 and sensing element 127. Converter 121 is assigned the electrical symbol Z1. Commerically available devices designated AD537JD are satisfactory for use as converter 121.

Line 126 directs the DC energy available after flowing through resistor 125 to temperature sensing element 127. Analog Devices Inc. has a commercially available device number AD 590KF which can be used as element 127. This element is a silicon energy band gap temperature sensor. Other devices satisfactory for use as sensing element 127 include a temperature sensitive resistor, a thermocouple, a thermistor, a silicon resistor, or a platinum resistor. The main requirement is that sensing element 127 change its electrical output in proportion to its temperature. Diode 90 is attached to line 126 to prevent AC current from flowing to sensing element 127 and to regulate the value of DC voltage on line 126.

Line 128 directs the DC current from element 127 back to summing resistor 92 as an electrical input to vary the frequency output of converter 121. Resistors 129 and 130 provide a stable current for addition to the changing current from sensing element 127 which varies as its temperature changes.

Frequency adjusting network 131 which includes capacitor 91 controls the output of converter 121 to within a preselected frequency range. For the electrical circuit shown in FIG. 2, frequency adjusting network 131 is selected to control the alternating current (AC) output from converter 121 to within the frequency range of 200 to 400 hertz. The output from converter 121 is directed back to terminal 46 through line 122 via resistors 123 and 124. A signal of 200 hertz at terminal 46 represents the lowest temperature that sensor 120 can report. A signal of 400 hertz at terminal 46 represents the highest temperature that sensor 120 can report. Sensing element 127 (AD590KF) is selected so that this frequency range corresponds to a temperature range of $-100°$ F. to $+500°$ F. As will be explained later, temperature sensor 120 responds very quickly to changes in the temperature of the surrounding fluid because sensing element 127 is placed within housing means 206 having a special thermal "window". The "window" allows the temperature of element 127 to quickly follow changes in the fluid temperature exterior to housing means 206 without having to change the temperature of the entire well tool carrying sensor 120.

Line 48 directs electrical power from terminal 46 to terminal 47 bypassing the electrical components of temperature sensor 120. Preferably, terminal 46 is located at one end of the tool carrying sensor 120 and terminal 47 at the other. This configuration allows electrical line 41 to supply power to the electrical components of sensor 120 and to any other well tool attached to terminal 47.

Electrical Operating Sequence

DC electrical energy flows from terminal 46 through line 122 and resistors 123, 124 and 125 to operate converter 121. DC energy also flows from terminal 46 to temperature sensing element 127 via line 122, resistor 125, and line 126. The value of the DC current flow through element 127 changes in proportion to changes in the temperature of element 127. The combined current from resistor 129 and 130 plus current from sensing element 127 is directed to ground via summing resistor 92. Voltage changes across summing resistor 92 provide the input to converter 121 to vary the frequency of converter 121' output in proportion to the temperature of element 127. The alternating current (AC) output from converter 121 is directed via resistors 123 and 124 to terminal 46. Electrical line 41 can then return the AC signal to the well surface where recording means 50 converts the signal into a temperature reading. Resistors 123 and 124 are part of the output circuit from converter 121. Capacitor 93 located between these two resistors acts as a filter for the output circuit.

Mechanical Components

Figure 3B:
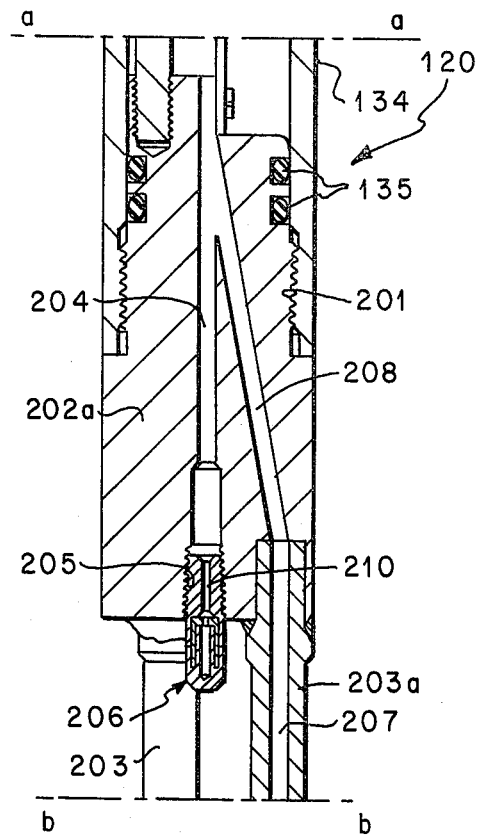
Figure 3C:
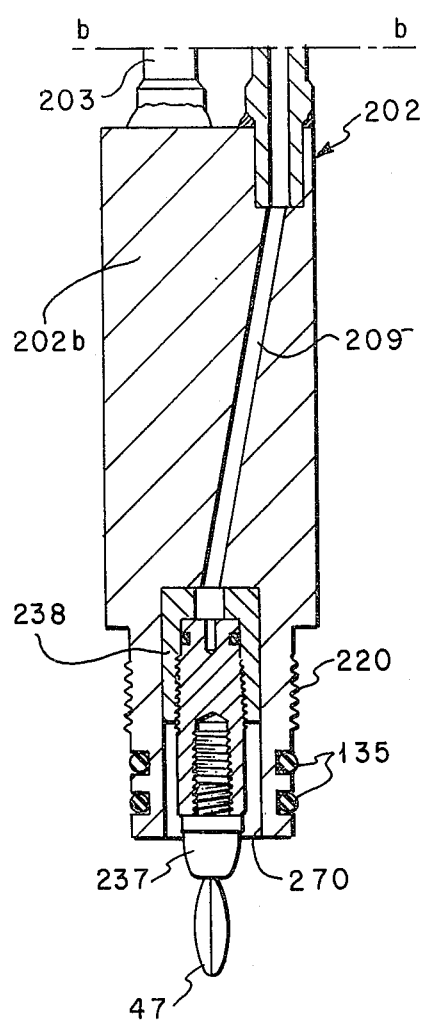
Figure 4:
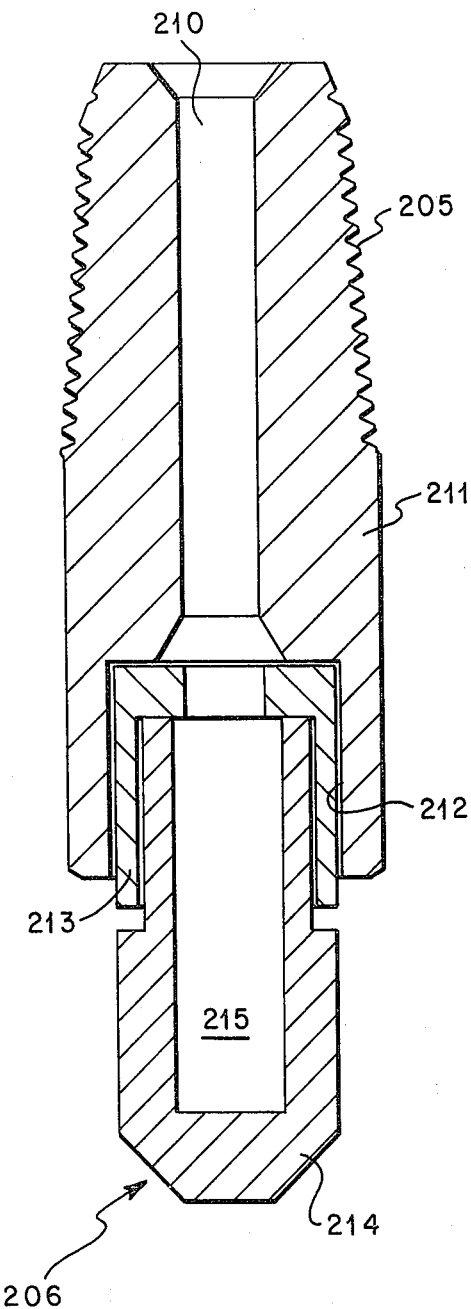
FIG. 4 is an enlarged drawing showing the housing means in which the temperature sensing element of the well tool in FIG. 3 is disposed.

FIGS. 3A, B and C show the mechanical components which comprise temperature sensor 120. Except as noted in the following comments, most of the electrical components shown in FIG. 2 are carried on circuit board 133 within tubular portion 134 of well tool 200. Temperature sensor 120 of the present invention includes the electrical circuit shown in FIG. 2 and the mechanical configuration of well tool 200. The electrical circuit and well tool 200 cooperate together to produce the desired results of fast response, greater accuracy, and increased flexibility for use of other downhole tools which characterize temperature sensor 120. Well tool 200 has three major subassemblies which are adapter subassembly 136, tubular portion 134, and end assembly 202. Elastomeric seals 135 are provided to block well fluids from entering portion 134 and the electrical terminals at both ends of tool 200.

Adapter subassembly 136 is provided to attach temperature sensor 120 to another well tool or directly to electric line 41 by conventional techniques. Threads 150 are used to make the mechanical connection with wireline 41 and/or other well tools. Electrical contact (not shown) is made with receptacle 151. Electrical insulating material 138 surrounds receptacle 151 and electrically isolates receptacle 151 from the other portions of adapter subassembly 136. Electrical connector 137 (a banana plug) is inserted into receptacle 151. The tip of connector 137 functions electrically as terminal 46. Insulating material 138 prevents electrical energy from flowing from terminal 46 into adapter 136.

Tubular portion 134 is a cylindrical, hollow sleeve with threads 201 formed on its inside diameter adjacent to each end. Adapter subassembly 136 is engaged by threads 201 to one end of portion 134. End assembly 202 is engaged by threads 201 with tubular portion 134 opposite from adapter 136. End assembly 202 consists of two cylindrical solid body sections designated 202a and 202b. Sections 202a and 202b have a generally uniform outside diameter matching the outside diameter of portion 134. They are connected to each other by a plurality of spacers 203 with their longitudinal axis concentrically aligned. The separation provided by spacers 203 between sections 202a and 202b is an important feature of the present invention which will be explained later.

Section 202a has passageway 204 drilled along its longitudinal axis and extends therethrough. One end of passageway 204 communicates with the interior of portion 134 and is located adjacent to circuit board 133.

The other end of passageway 204 opens into the space between sections 202a and 202b provided by spacers 203. Threads 205 are formed within passageway 204 adjacent this other end. Housing means 206 carries matching threads 205 which allow housing means 206 to be engaged with passageway 204 to block fluid communication from the exterior of temperature sensor 120 to the interior of tubular portion 134.

Preferably, one of the spacers 203 will have longitudinal bore 207 extending therethrough. This spacer has been designated 203a in FIG. 3. Also, section 202a preferably has a second passageway 208 extending obliquely therethrough and intersecting passageway 204. Spacer 203a is aligned with sections 202a so that passageway 208 can communicate with bore 207.

Section 202b has threads 220 on its exterior near the extreme end of section 202b which is also the extreme end of tool 200 from wireline 41. Threads 220 may be used to attach another downhole tool to tool 200, or an end cap (not shown) may be attached. Recess 270 extends partially into section 202b from this same end. Connector 237 (a banana plug) is carried within recess 270. Electrical insulation material 238 is used to isolate connector 237 from section 202b. The tip of connector 237 functions electrically as terminal 47 in FIG. 2. Passageway 209 is drilled obliquely through section 202b. One end of passageway 209 communicates with bore 207 and the other end with recess 270. Oblique passageways 208 and 209 and bore 207 provide means for extending wire 48 from circuit board 133 to terminal 47 without being exposed to well fluids.

Housing means 206 is located between sections 202a and 202b in the separation provided by spacers 203 so that housing means 206 will be fully exposed to well fluids and still be protected from mechanical damage as sensor 120 is raised and lowered through the well bore. Housing means 206 is generally cylindrical with one end open and the other end closed. Threads 205 surround the open end so that housing means 206 can be engaged with passageway 204 and extend from section 202a. The portion of housing means 206 carrying threads 205 is basically a pipe plug 211 with bore 210 therethrough. The end of plug 211 opposite threads 205 has an enlarged inside diameter portion 212 within bore 210.

Insulator 213 is disposed within enlarged inside diameter portion 212 and heat sink 214 inserted in turn within insulator 213. Plug 211, insulator 213, and heat sink 214 are concentrically aligned and communicate with passageway 204 via bore 210. Epoxy resins are preferably used to assemble housing means 206. Plug 211 can be manufactured from any material compatible with section 202a. Insulator 213 is preferably selected from materials having a high resistance to conducting thermal energy (low thermal conductivity) such as material sold under the trademark RYTON. Heat sink 214 is preferably manufactured from metal having a very low resistance to conducting thermal energy (high thermal conductivity) such as aluminum, copper, or brass.

Temperature sensitive element 127 is positioned within cavity 215 of heat sink 214. Lines 126 and 128 can be extended from circuit board 133 through passageway 204 and bore 210 to sensing element 127. Various heat sink lubricants are available if desired to fill cavity 215 after element 127 has been installed. Heat sink 214 functions as a thermal "window" to allow the temperature of fluid in the space between sections 202a and 202b to quickly act upon sensing element 127. Insulator 213 allows the temperature of heat sink 214 to change without having to change the temperature of the other metal components in well tool 200. This configuration of housing means 206 prevents the thermal inertia of well tool 200 from slowing the response time of sensing element 127.

The previously described temperature sensor 120 can be readily adapted for use in other temperature measuring systems. The previous description is illustrative of only one embodiment of the present invention. Changes and modifications will be readily apparent to those skilled in the art and may be made without departing from the scope of the invention which is defined in the claims.

We claim:

1. A temperature sensor for measuring well fluid temperatures comprising:
   a. a terminal for receiving electrical power supplied to the sensor and transmitting information from the sensor;
   b. a temperature sensing element which changes its electrical output in proportion to the surrounding fluid temperature;
   c. a voltage to frequency converter;
   d. a voltage regulating network connecting the terminal with both the sensing element and the converter and directing electrical power to each;
   e. the output from the sensing element supplying an input to the converter;
   f. the converter producing a frequency signal which is proportional to the output from the sensing element;
   g. a well tool carrying the electrical components of the sensor;
   h. a plug means with threads on one end for engagement with the well tool;
   i. a longitudinal bore extending through the plug means having an enlarged inside diameter portion opposite the one end;
   j. a heat sink disposed within the enlarged inside diameter portion and having a cavity extending partially therethrough;
   k. the cavity and longitudinal bore communicating with each other to allow installation of the temperature sensing element within the cavity; and
   l. thermal insulating material disposed between the exterior of the heat sink and the interior of the enlarged inside diameter portion.

2. A temperature sensor, as defined in claim 1, further comprising:
   a. the plug means attached to and extending from the well tool to allow contact between the plug means and fluids surrounding the well tool; and
   b. the portion of the plug means adjacent to the sensing element being manufactured from a metal having a value of thermal conductivity higher than the material used to manufacture the other parts of the well tool.

3. A temperature sensor, as defined in claim 2, wherein the portion of the plug means adjacent to the sensing element is manufactured from the group of metals consisting of aluminum, brass, or copper.

4. A temperature sensor, as defined in claim 1, wherein the sensing element is selected from the group of temperature detectors consisting of a thermocouple, thermistor, silicon resistor, or platinum resistor.

5. A well tool for measuring temperature at a downhole location within a well bore, comprising:

a. a temperature sensing element disposed within a housing means;
b. electrical circuits to provide electrical power to the sensing element and to monitor changes in the electrical characteristics of the sensing element as its temperature changes;
c. a portion of the housing means adjacent to the sensing element having a low resistance to conducting thermal energy as compared to the well tool;
d. a hollow tubular portion with an electrical circuit board disposed therein;
e. means for electrically and mechanically connecting the well tool to an electric wireline attached to one end of the tubular portion;
f. an end assembly attached to the opposite end of the tubular assembly;
g. the end assembly having a first section and a second section separated longitudinally from each other by a plurality of spacers;
h. the length of the spacers being greater than the length of the housing means; and
i. the housing means projecting from one section into the space between the first and second sections.

6. A well tool for measuring temperature at a downhole location within a well bore, comprising:
a. a temperature sensing element disposed within a housing means;
b. electrical circuits to provide electrical power to the sensing element and to monitor changes in the electrical characteristics of the sensing element as its temperature changes;
c. a portion of the housing means adjacent to the sensing element having a low resistance to conducting thermal energy as compared to the well tool;
d. a hollow tubular portion with an electrical circuit board disposed therein;
e. means for electrically and mechanically connecting the well tool to an electric wireline attached to one end of the tubular portion;
f. an end assembly attached to the opposite end of the tubular assembly;
g. the end assembly having a first section and a second section separated longitudinally from each other by a plurality of spacers;
h. the housing means projecting from one section into the space between the first and second sections and further comprising;

a plug means engaged with the first section of the end assembly;
a longitudinal bore extending through the plug means and having an enlarged inside diameter portion adjacent to its extreme end opposite the first section;
a heat sink disposed within the enlarged inside diameter portion and having a cavity extending partially therethrough for receiving the sensing element; and
thermal insulating material disposed between the exterior of the heat sink and the interior of the enlarged inside diameter portion.

7. A well tool for measuring temperature at a downhole location within a well bore, comprising:
a. a temperature sensing element disposed within a housing means;
b. electrical circuits to provide electrical power to the sensing element and to monitor changes in the electrical characteristics of the sensing element as its temperature changes;
c. a portion of the housing means adjacent to the sensing element having a low resistance to conducting thermal energy as compared to the well tool;
d. a hollow tubular portion with an elecrical circuit board disposed therein;
e. means for electrically and mechanically connecting the well tool to an electric wireline attached to one end of the tubular portion;
f. an end assembly attached to the opposite end of the tubular assembly;
g. the end assembly having a first section and a second section separated longitudinally from each other by a plurality of spacers;
h. the housing means projecting from one section into the space between the first and second sections;
i. a longitudinal bore extending through one of the spacers;
j. a passageway through the first section and communicating between the interior of the tubular portion and the longitudinal bore;
k. an electrical terminal carried at the extreme end of the second section and a passageway through the second section communicating between the terminal and the longitudinal bore; and
l. the longitudinal bore and passageways cooperating to provide a means for extending electrical wires from the circuit board to the terminal.

* * * * *